United States Patent Office 3,474,803
Patented Oct. 28, 1969

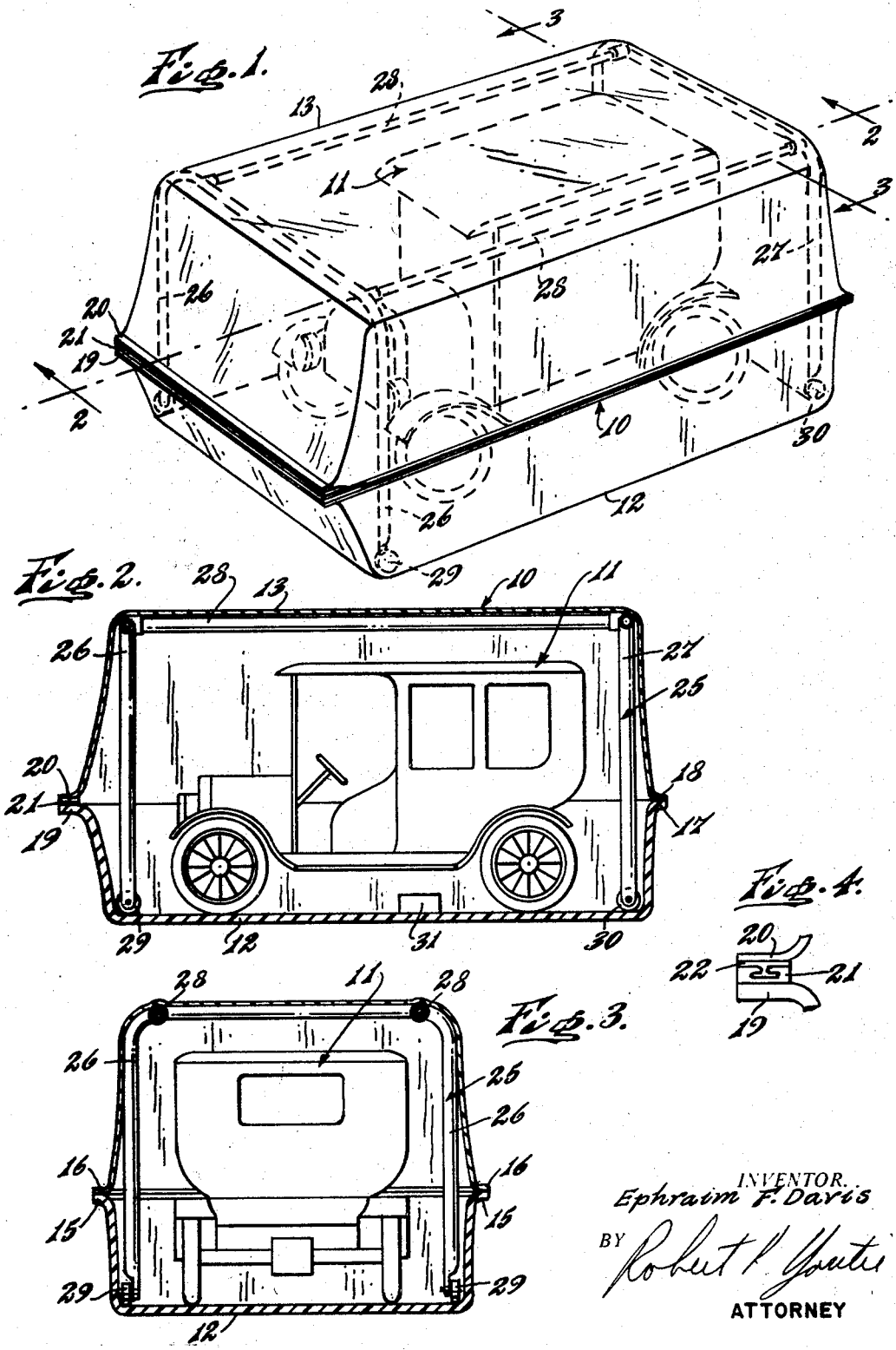

3,474,803
AUTOMOBILE ENCLOSURE
Ephraim F. Davis, 701 Shiloh Pike,
Bridgeton, N.J. 08302
Filed June 19, 1968, Ser. No. 738,153
Int. Cl. B60j 11/00
U.S. Cl. 135—5          8 Claims

ABSTRACT OF THE DISCLOSURE

The disclosure herein is concerned essentially with an enclosure for an automotive vehicle fabricated of impervious flexible sheet material in a generally baglike form into which the vehicle may be moved, and the enclosure then closed to effectively seal the contained vehicle until the closure is opened and the vehicle removed.

BACKGROUND OF THE INVENTION

As is well known, the practice of refurbishing and maintaining old and antique cars involves meticulous care of the vehicles. The care required to maintain such vehicles free of dirt and duct, as well as corrosion and rust, is time consuming and expensive. The mere placement of such vehicles in a garage is insufficient, the expense of an air-conditioned building having been found necessary to avoid the labor and expense of constant maintenance.

SUMMARY

It is an important object of the present invention to provide an enclosure for automotive vehicles which substantially completely maintains such vehicles free from dust and other dirt, as well as rust and corrosion, with an absolute minimum of effort and expense.

It is another object of the present invention to provide an impervious receptacle into which an automotive vehicle may be entered and withdrawn as desired, and which can be effectively sealed against moisture and dirt to maintain the received vehicle in substantially perfect condition.

It is a further object of the present invention to provide an automobile enclosure having the advantageous characteristics mentioned in the preceding paragraphs, which is extremely simple in construction, durable and reliable throughout a long useful life, and which can be economically manufactured for sale at a reasonable price.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is a top perspective view showing an automobile enclosure of the present invention in operative condition of use.

FIGURE 2 is a longitudinal sectional view taken generally along the line 2—2 of FIGURE 1, and illustrating in phantom the open condition of the enclosure for entry and removal of a vehicle.

FIGURE 3 is a transverse sectional view taken generally along the line 3—3 of FIGURE 1.

FIGURE 4 is an enlarged fragmentary sectional view similar to FIGURE 2, illustrating a closure construction for the instant automobile enclosure.

DESCRIPTION OF THE PREFERRED EMBODIMENT

Referring now more particularly to the drawing, and specifically to FIGURES 1–3 thereof, an enclosure of the present invention is there generally designated 10, and shown in position receiving an automobile vehicle 11.

More particularly, the enclosure 10 is advantageously fabricated substantially completely of flexible sheet material and assumes the form of a receptacle or bag. While the enclosure or receptacle 10 may be constructed otherwise, say in the form of a rectangular or gusseted bag, the illustrated embodiment discloses a generally flat-type bag including a generally rectangular bottom wall 12 and a generally rectangular top wall 13 superposed in substantially congruent relation over the bottom wall. The bottom wall 12 is preferably of a plastic material, such as polyethylene or other suitable flexible plastic sheet material impervious to the passage of moisture and air. The lower or bottom sheet or wall 12 is preferably of relatively heavy gauge to resist wear, for reasons which will presently become apparent. The upper sheet or top wall 13 is also advantageously of a flexible plastic material impervious to moisture and air, and may be of a lighter or thinner gauge than the lower wall 12.

The adjacent longitudinal margins or edge portions 15 of the lower sheet 12 are secured, as by heat sealing, adhesive or otherwise in a sealed relation to the adjacent respective longitudinal margins or edge portions 16 of the upper sheet 13. Also, one end edge portion of the lower wall 12, say the front end edge portion, as at 17, is suitably secured, in sealed relation with respect to the forward end edge portion 18 of the upper sheet 13, see FIGURE 2.

The rear end edge portion 19 of the lower sheet 12, and the rear end edge portion 20 of the upper sheet 13 are advantageously provided with closure means 21 adapted for detachable securement in sealed relation. One such suitable closure means is shown in detail in FIGURE 4, as including an elongate female formation 21 on the upper or inner surface of the lower sheet edge portion 19, and a mating male formation 22 on the lower surface of the upper sheet end portion 20. The formations 21 and 22 are resiliently interengageable with each other, as seen in FIGURE 4, and detachable from each other as seen in phantom in FIGURE 2, to selectively provide a sealed rear end closure capable of being opened for entry and removal therethrough of a vehicle 11.

While the baglike receptacle 10 may be manually distended during entry of a vehicle 11, if desired, it is more convenient to employ interiorly of the receptacle a framework, as at 25 to maintain the receptacle distended. Such a framework may include a pair of generally parallel, forwardly and rearwardly spaced inverted U-shaped members or arches 26 and 27, which may be connected together, as by one or more longitudinal frame members 28. For convenient mobility the framework 25, as on the lower ends of arch members 26 and 27, may be provided with ground-engageable rollers or wheels 29 and 30.

Thus, the framework 25, with the lower receptacle portion or wall 12 resting on a ground surface and the upper receptacle wall 13 held above the ground surface to maintain the rear receptacle end open, is adapted to receive the framework 29 rolled into the receptacle on the bottom portion or wall 12. In this condition, the receptacle 10 is effectively held stationary, and a vehicle 11 may be rolled forwardly through the rear end opening of the receptacle into the illustrated position within the receptacle, as distended by the framework 25. Advantageously, the framework is configured and sized to maintain the receptacle walls adjacent to but spaced from the contained vehicle 11. The open rear end of the receptacle 10 may then be closed to completely and hermetically seal the interior of the receptacle.

If desired, a container of desiccant, as at 31, may be placed interiorly of the receptacle 10 to remove moisture or vapor from the contained air, and further inhibit corrosion and rust.

From the foregoing, it is seen that the present invention provides an automobile enclosure which fully accomplishes its intended objects and is well adapted to meet practical conditions of manufacture, distribution and use.

Although the present invention has been described in some detail by way of illustration and example for purposes of clarity of understanding, it is understood that certain changes and modifications may be made within the spirit of the invention and scope of the appended claims. For example, the device of the present invention may be employed in conjunction with equipment other than automobiles, as when it is desired to afford protection from the atmosphere and provide visual access to the equipment.

What is claimed is:

1. A protective enclosure for an automotive vehicle having wheeled running gear comprising a receptacle fabricated of air and moisture impervious transparent flexible sheet material having at least one end open, said receptacle and said one open end being sized to receive a full-size vehicle moving on its running gear through said one end, one portion of said receptacle material being substantially flat and of a heavier material than the remainder of said receptacle for flat bearing engagement with a ground surface beneath the running gear of a received vehicle, and closure means for effecting substantially airtight closure of said one receptacle end, whereby a vehicle is movable on its running gear into and out of said receptacle on said one material portion for isolation of a vehicle from external moisture and dirt when said closure means is closed.

2. A protective enclosure according to claim 1, said closure means comprising detachable interfitting formations on said one receptacle end.

3. A protective enclosure according to claim 1, in combination with a support interiorly of said receptacle to maintain the latter distended for convenient entry and removal of a vehicle.

4. A protective enclosure according to claim 3, said support comprising an open framework sized to maintain the receptacle spaced from a received vehicle.

5. A protective enclosure according to claim 3, said support comprising an open framework, and wheels mounting said framework for movement into and out of said receptacle on said one portion thereof.

6. A protective enclosure according to claim 1, said receptacle comprising a generally rectangular lower sheet defining said one portion, and a generally rectangular upper sheet secured in sealed relation to said lower sheet along three sides thereof.

7. A protective enclosure according to claim 6, said lower and upper sheets being of plastic material.

8. A protective enclosure according to claim 6, said lower and upper sheets being secured directly together along three adjacent pairs of respective sheet margins.

References Cited

UNITED STATES PATENTS

| 2,823,721 | 2/1958 | Svec et al. | 150—3 |
| 2,913,029 | 11/1959 | Paton | 150—1 |
| 3,020,945 | 2/1962 | Brunner | 150—3 |
| 3,095,231 | 6/1963 | Reed. | |
| 3,399,686 | 9/1968 | Horton | 135—1 |
| 3,411,265 | 11/1968 | Carpenter et al. | 229—43 X |

FOREIGN PATENTS 850,513  10/1960  Great Britain.

PETER M. CAUN, Primary Examiner

U.S. Cl. X.R.

150—52